US012667924B2

(12) United States Patent
Otto et al.

(10) Patent No.: US 12,667,924 B2
(45) Date of Patent: Jun. 30, 2026

(54) ASSEMBLY TABLE DROP-DOWN PLATFORM

(71) Applicant: Builders FirstSource, Inc., Irving, TX (US)

(72) Inventors: Kalli Otto, Boise, ID (US); Chris Brown, Nampa, ID (US); Kendrick Miller, Nampa, ID (US); Chad Svedin, Caldwall, ID (US)

(73) Assignee: Builders FirstSource, Inc., Irving, TX (US)

( * ) Notice: Subject to any disclaimer, the term of this patent is extended or adjusted under 35 U.S.C. 154(b) by 354 days.

(21) Appl. No.: 17/650,372

(22) Filed: Feb. 8, 2022

(65) Prior Publication Data

US 2023/0249299 A1    Aug. 10, 2023

(51) Int. Cl.
| | |
|---|---|
| *B23Q 3/00* | (2006.01) |
| *B23Q 3/10* | (2006.01) |
| *B23Q 7/00* | (2006.01) |
| *B23Q 7/05* | (2006.01) |
| *B27F 7/15* | (2006.01) |

(52) U.S. Cl.
CPC ............. *B23Q 3/101* (2013.01); *B23Q 7/005* (2013.01); *B23Q 7/05* (2013.01); *B27F 7/155* (2013.01)

(58) Field of Classification Search
CPC .. B23Q 3/00; B23Q 3/101; B23Q 7/05; B27F 7/155; B25B 11/00
See application file for complete search history.

(56) References Cited

U.S. PATENT DOCUMENTS

| | | | | |
|---|---|---|---|---|
| 1,389,068 A | * | 8/1921 | Olson | B25H 1/00 |
| | | | | 269/70 |
| 3,458,056 A | | 7/1969 | Stefan et al. | |
| 3,458,057 A | | 7/1969 | Stefan et al. | |
| 3,625,504 A | | 12/1971 | Walker | |
| 3,672,312 A | | 6/1972 | Pettit et al. | |
| 4,640,326 A | | 2/1987 | Hewitt | |
| 4,998,336 A | | 3/1991 | Papsdorf | |
| 5,092,028 A | | 3/1992 | Harnden | |
| 5,673,843 A | * | 10/1997 | Gainey | B23K 37/0533 |
| | | | | 269/902 |

(Continued)

FOREIGN PATENT DOCUMENTS

| | | |
|---|---|---|
| CN | 110550411 A | 12/2019 |

OTHER PUBLICATIONS

Fabcon, "Drop Down Conveyor", Feb. 17, 2016, 3 pages [retrieved on Nov. 11, 2022 from https://www.fabcon.com/drop-down-conveyor/].

*Primary Examiner* — Lee D Wilson
(74) *Attorney, Agent, or Firm* — Alston & Bird LLP

(57) ABSTRACT

Devices, systems, and methods used to assemble a structural member, such as a floor truss, are disclosed. The systems include a structural member assembly table including a worktable and a drop-down platform pivotably coupled to the worktable. The drop-down platform includes an end datum and a drop-down mechanism coupled to the support surface. The drop-down mechanism is configured to transition the support surface from an operational position to an eject position to drop the end datum below a work surface of the worktable to eject the assembled structural member from the worktable.

14 Claims, 8 Drawing Sheets

(56)         References Cited

U.S. PATENT DOCUMENTS

| | | | |
|---|---|---|---|
| 5,725,205 A * | 3/1998 | O'Berg | B25H 1/00 |
| | | | 269/37 |
| 6,702,269 B1 * | 3/2004 | Tadich | B27F 7/155 |
| | | | 269/304 |
| 7,866,642 B2 * | 1/2011 | McAllister | B23Q 1/035 |
| | | | 269/910 |
| 8,136,804 B2 | 3/2012 | Leith | |
| 9,534,439 B2 | 1/2017 | Briese et al. | |
| 9,555,508 B2 | 1/2017 | Privett et al. | |
| 9,895,775 B2 | 2/2018 | Koscielski et al. | |
| 10,589,390 B2 | 3/2020 | Muncie | |
| 10,800,609 B2 | 10/2020 | Bellar et al. | |
| 10,858,197 B2 | 12/2020 | Karol et al. | |

* cited by examiner

160

163

161

165

165

166

164

ASSEMBLY TABLE DROP-DOWN PLATFORM

TECHNICAL FIELD

The present disclosure relates generally to assembly tables to assemble a structural member. More specifically, the present disclosure relates to assembly tables to assemble structural members such roof and floor trusses.

BRIEF DESCRIPTION OF THE DRAWINGS

The embodiments disclosed herein will become more fully apparent from the following description and appended claims, taken in conjunction with the accompanying drawings. These drawings depict only typical embodiments, which will be described with additional specificity and detail through use of the accompanying drawings in which:

DETAILED DESCRIPTION

Figure 1:
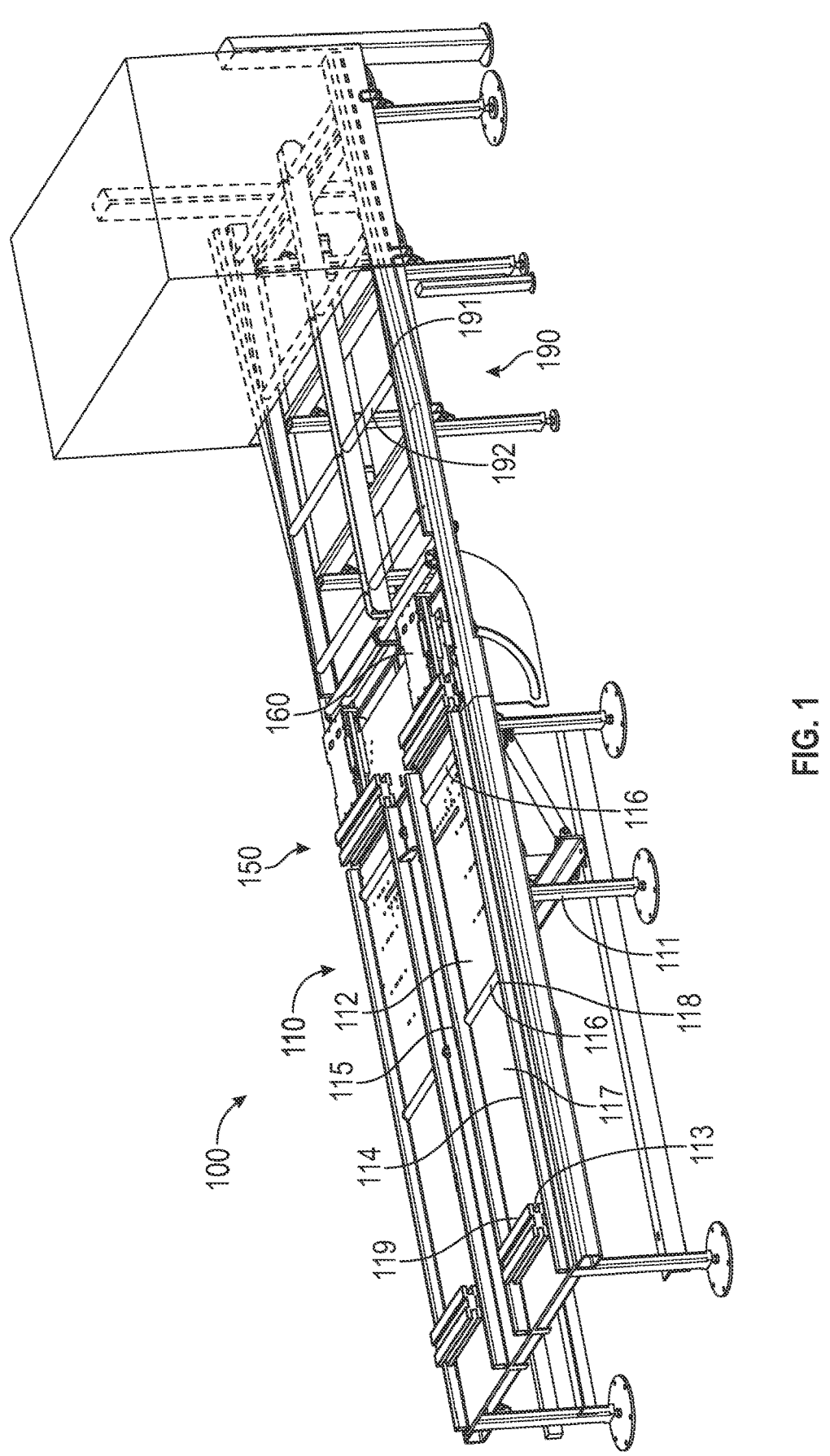
FIG. 1 is a perspective view of a structural member assembly table, according to one embodiment of the present disclosure.

In certain instances, an assembly table is utilized to assemble a structural member. The structural member can be a truss, used to support a load over a distance. The truss can be a floor truss, a roof truss, etc. The structural member can be a wall, or a sub-element of a wall. The assembly table can reduce repetitive motion related injuries for workers, improve the quality of the structural members, and increase manufacturing output.

Embodiments herein describe a structural member assembly table that includes an elongate worktable configured to support and constrain a structural member (e.g., a floor truss) during assembly on a horizontally oriented work surface. In other embodiments within the scope of this disclosure, the assembly table may be used to assemble any type of structural members, such as a roof truss, a wall, and a sub-element of a wall. The assembly table further includes a drop-down platform pivotably coupled to an end of the worktable. The drop-down platform includes a support surface configured to support an end datum and a drop-down mechanism configured to downwardly pivot the support surface relative to the work surface from an operational position to an eject position to allow an assembled structural member to be ejected or moved from the worktable without elevating the structural member above the end datum. The end datum is configured to set a length of the floor truss in cooperation with a fixed end datum and to apply a longitudinal compressive force to the structural member to restrain the structural member in a desired location relative to the worktable during assembly of the structural member.

In some embodiments, the support surface is in a horizontal orientation in line with a plane of the work surface when the support surface is in the operational position as the structural member is assembled. Following assembly of the structural member, the support surface is transitioned to an eject position wherein it is pivoted downwardly by the drop-down mechanism such that the support surface is in a substantially perpendicular orientation relative to the work surface. When the drop-down platform is in the eject position, the end datum is disposed below the work surface of the worktable such that the assembled structural member can be ejected from the worktable by powered conveyor rollers onto a conveyor portion of the assembly table. In some embodiments, a gantry can move along the assembly table to press nail plates into the structural member when the drop-down platform is in the operational position and be returned to a home position when the drop-down platform is in the eject position.

Embodiments may be understood by reference to the drawings, wherein like parts are designated by like numerals throughout. It will be readily understood by one of ordinary skill in the art having the benefit of this disclosure that the components of the embodiments, as generally described and illustrated in the figures herein, could be arranged and designed in a wide variety of different configurations. Thus, the following more detailed description of various embodiments, as represented in the figures, is not intended to limit the scope of the disclosure, but is merely representative of various embodiments. While the various aspects of the embodiments are presented in the drawings, the drawings are not necessarily drawn to scale unless specifically indicated.

Figure 2A:
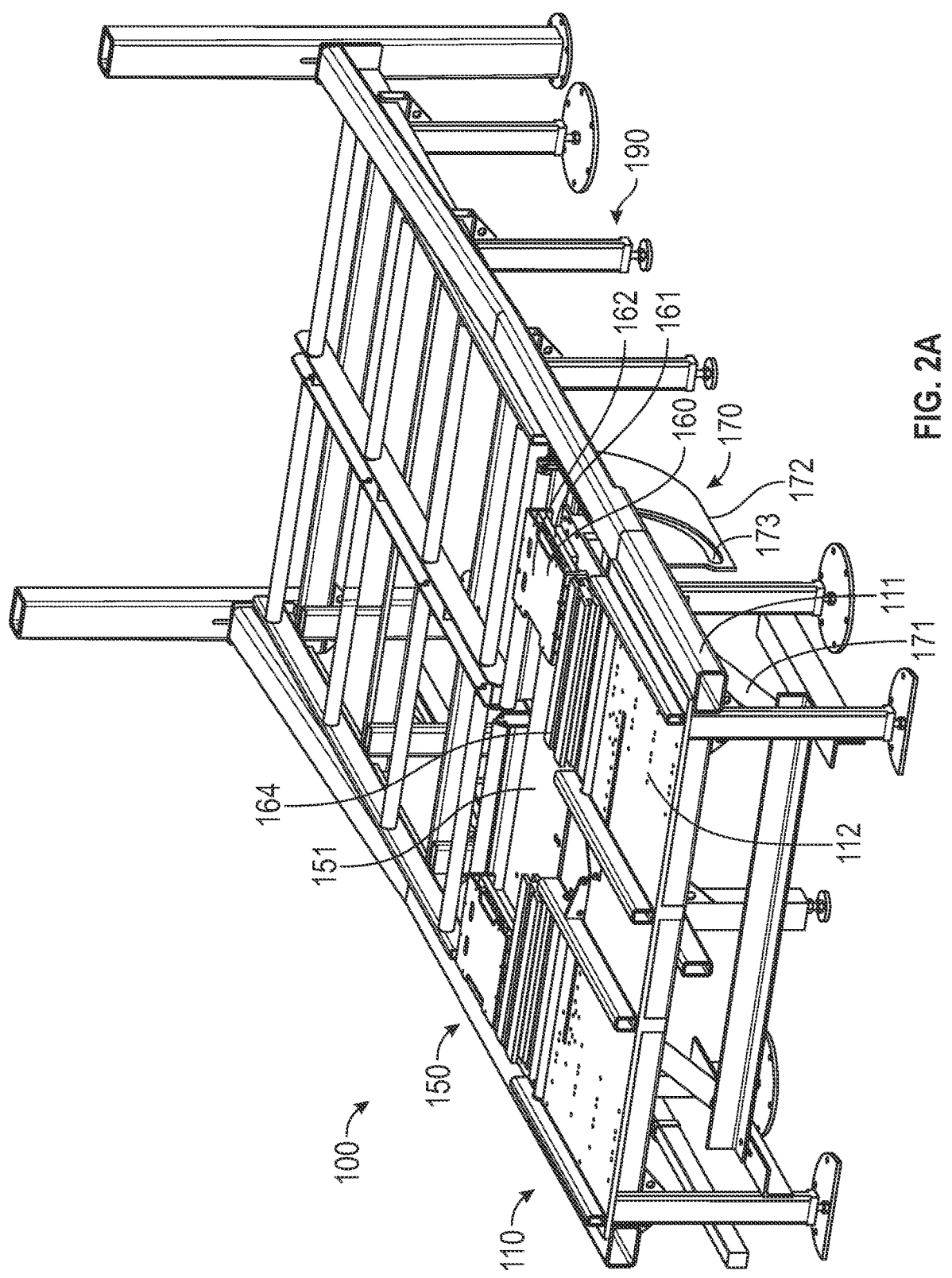
FIG. 2A is a top perspective view of an embodiment of a drop-down platform of the structural member assembly table of FIG. 1 in an operational position.
Figure 2B:
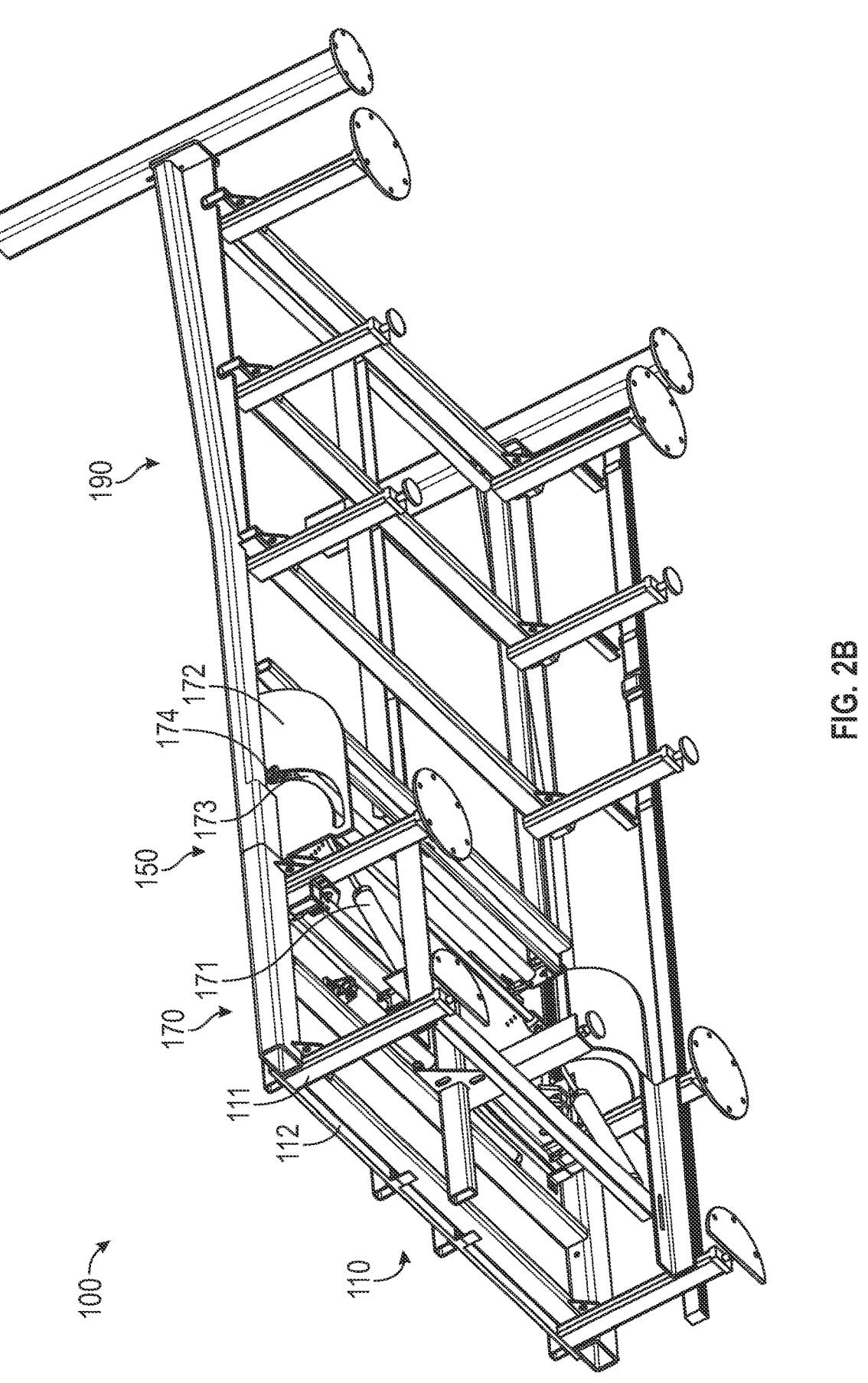
FIG. 2B is a bottom perspective view of an embodiment of a drop-down platform of the structural member assembly table of FIG. 1 in the operational position.
Figure 3A:
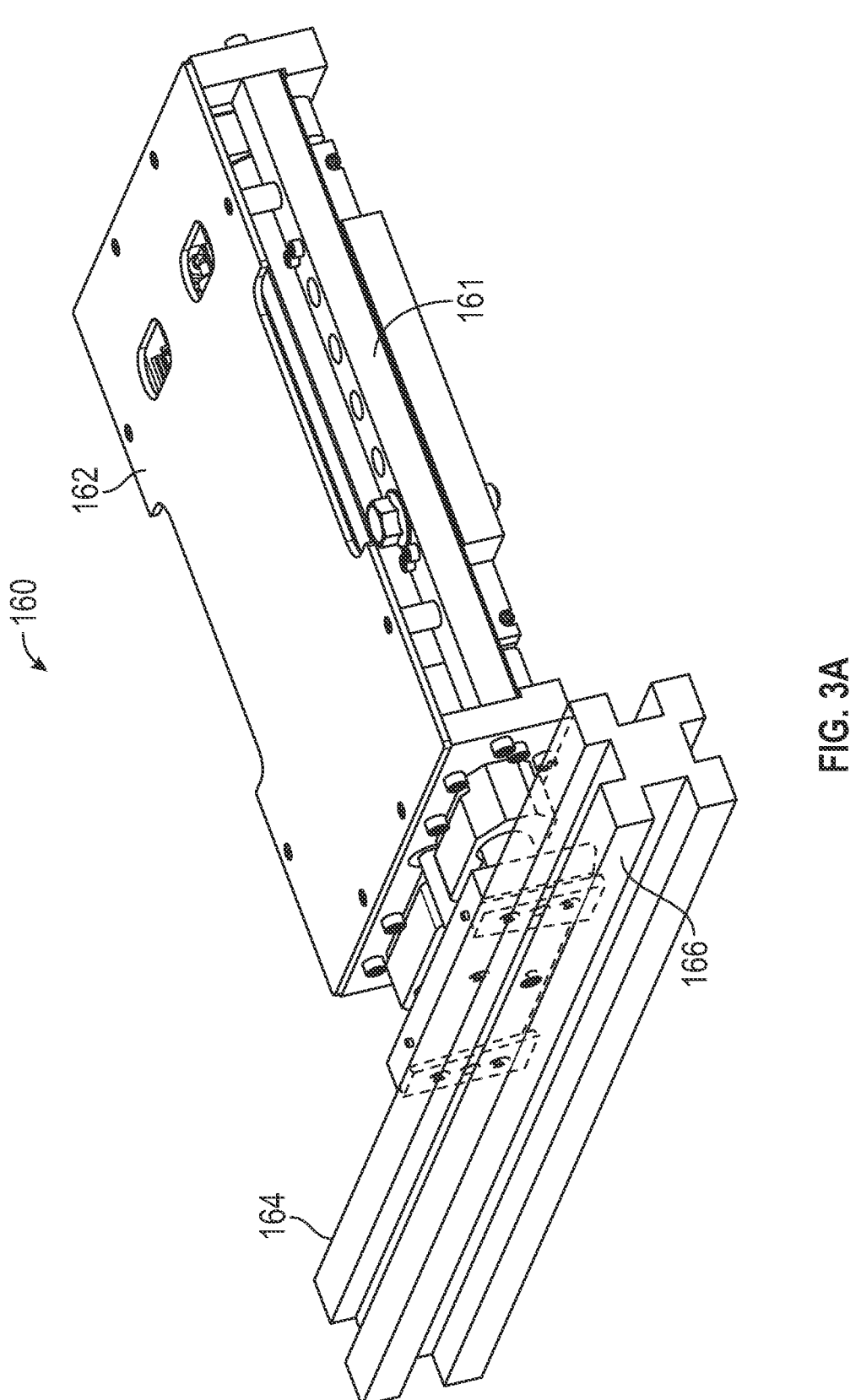
FIG. 3A is a perspective view of an embodiment of an end datum of the drop-down platform of FIGS. 2A and 2B in a non-actuated state and with a cover in place.
Figure 3B:
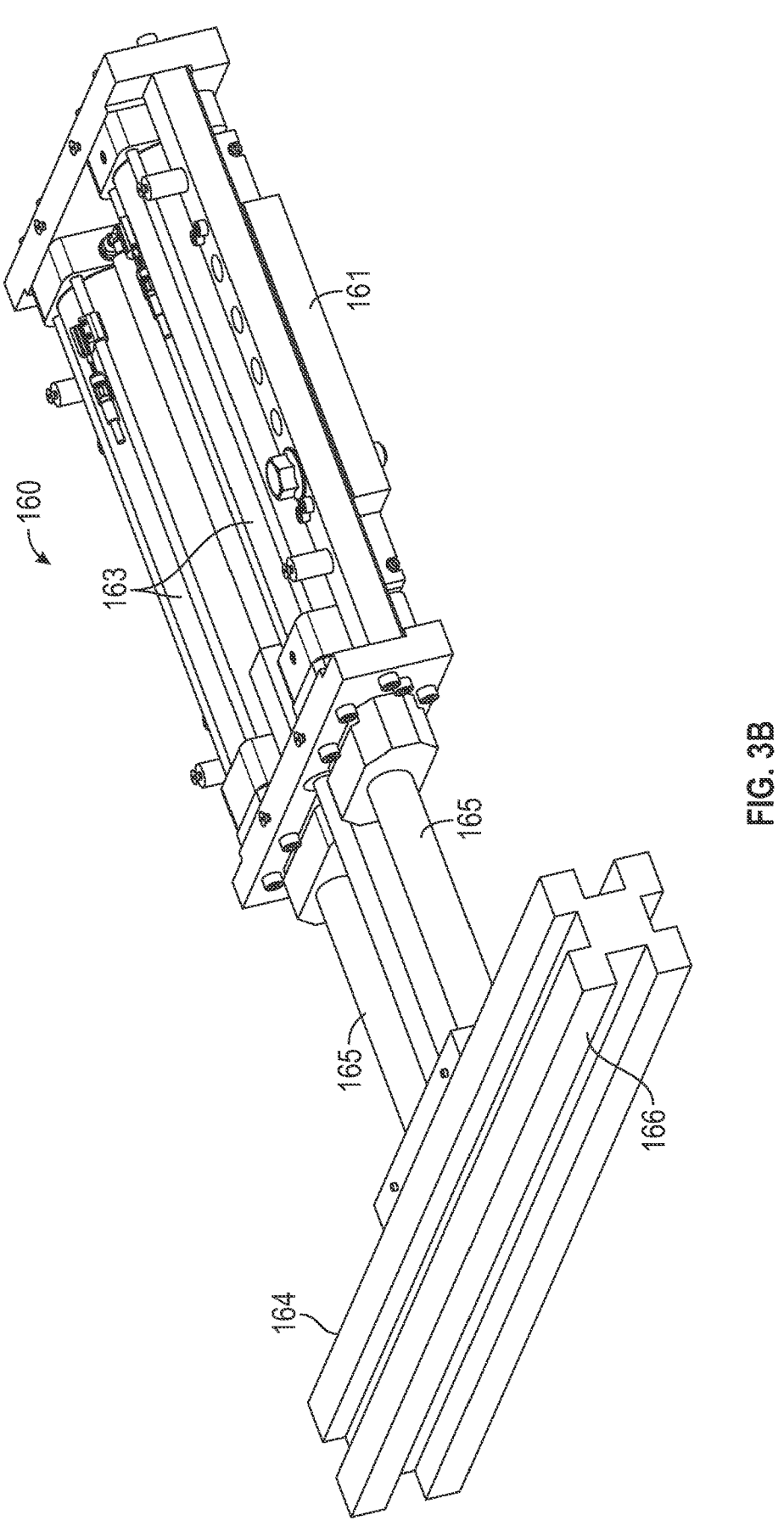
FIG. 3B is a perspective view of the end datum of the drop-down platform of FIGS. 2A and 2B in an actuated state and with the cover removed.
Figure 4:
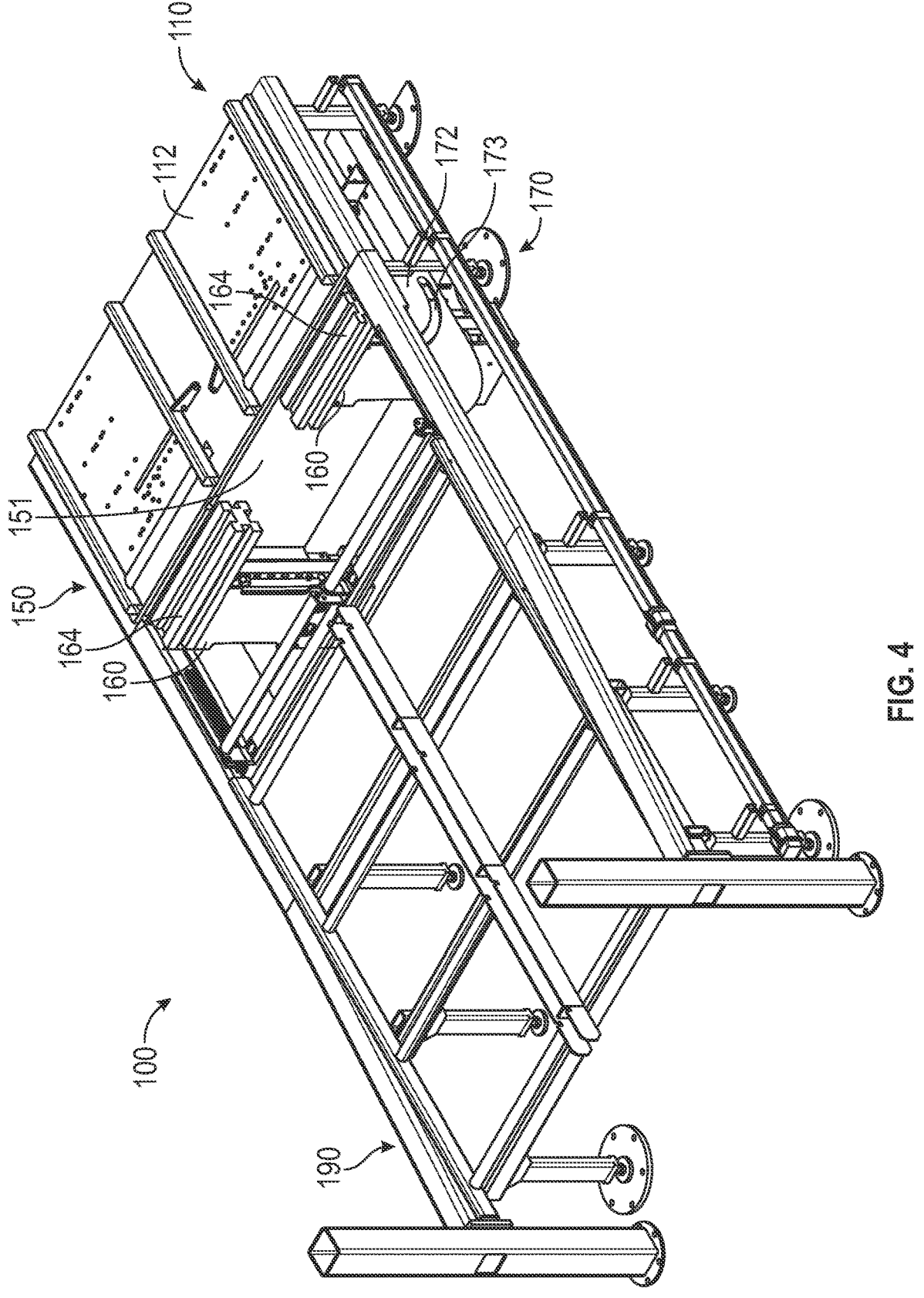
FIG. 4 is a perspective view of the drop-down platform of FIGS. 2A and 2B in an eject position.
Figure 5:
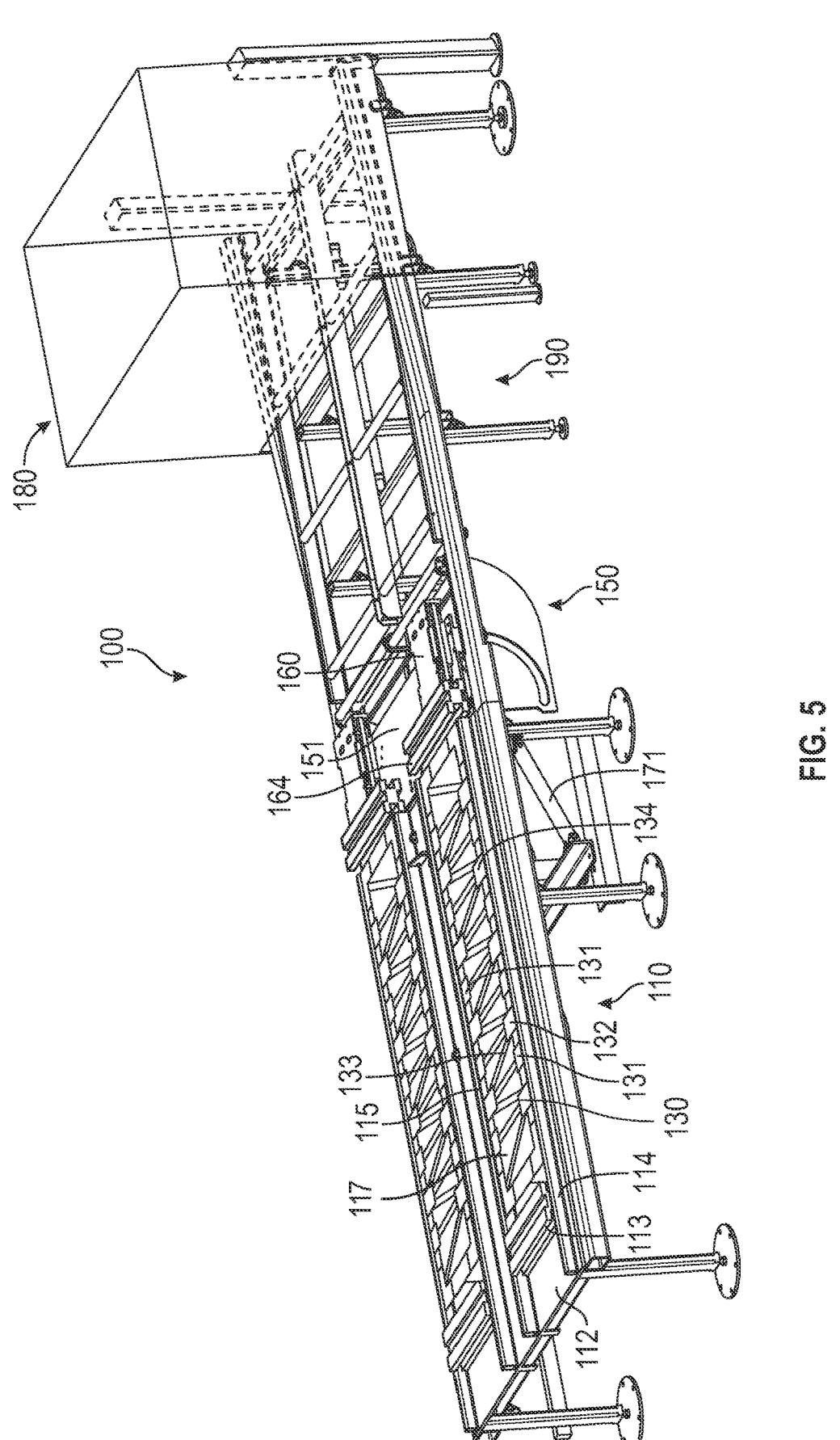
FIG. 5 is a perspective view of the structural member assembly table of FIG. 1 with a structural member being assembled.
Figure 6:
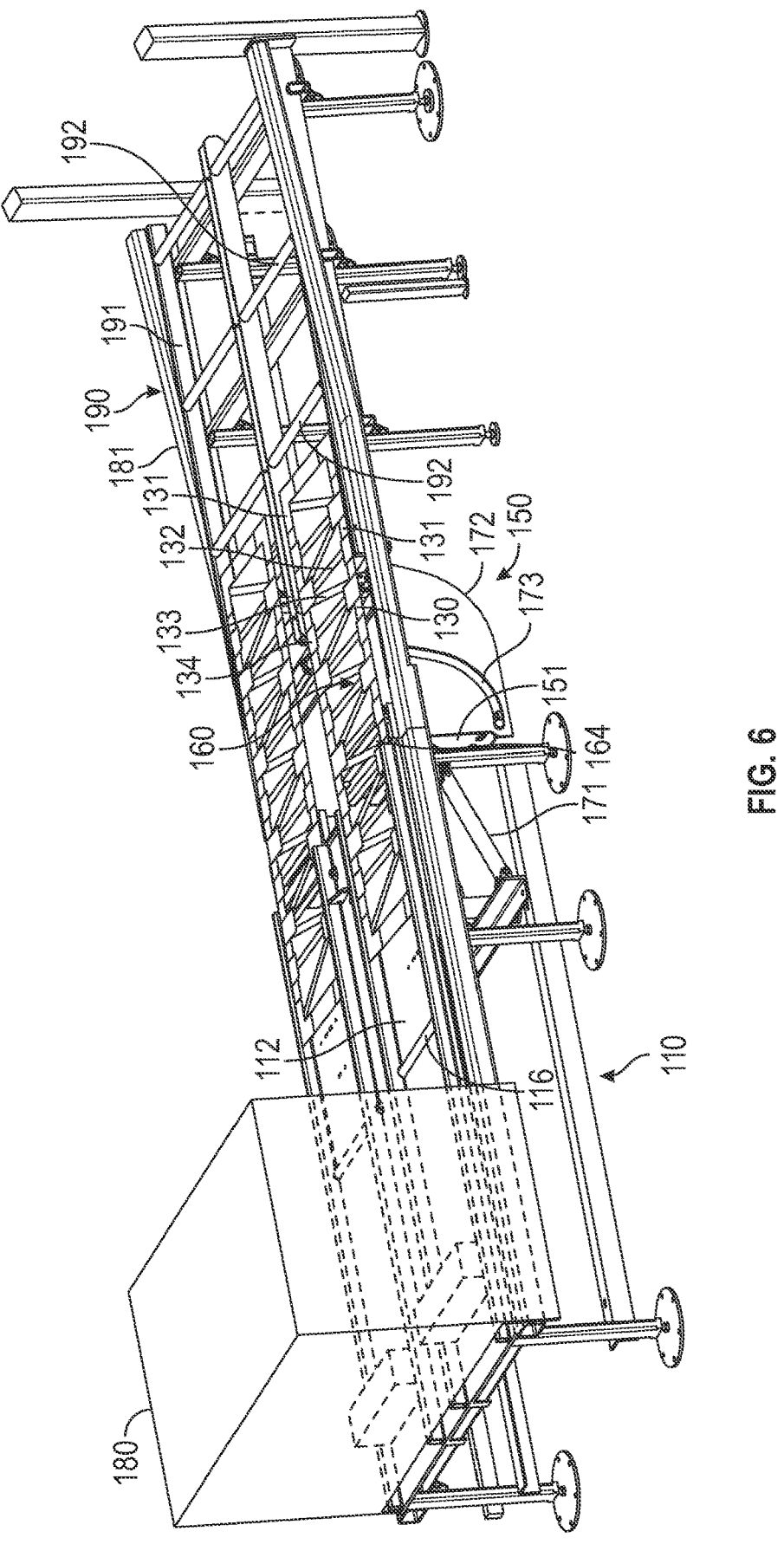
FIG. 6 is a perspective view of the structural member assembly table of FIG. 1 with the assembled structural member being ejected.

FIG. 1 illustrates an embodiment of a structural member assembly table. FIGS. 2A and 2B illustrate an embodiment of a drop-down platform. FIGS. 3A and 3B illustrate an embodiment of an end datum of the drop-down platform. FIG. 4 illustrates the drop-down platform in an eject position. FIGS. 5 and 6 illustrate a method of assembling a structural member utilizing the structural member assembly table. In certain views each device may be coupled to, or shown with, additional components not included in every view. Further, in some views only selected components are illustrated, to provide detail into the relationship of the components. Some components may be shown in multiple views, but not discussed in connection with every view. Disclosure provided in connection with any figure is relevant and applicable to disclosure provided in connection with any other figure or embodiment.

FIG. 1 is a perspective view of an embodiment of a structural member assembly table 100, according to one embodiment of the present disclosure. As illustrated in FIG. 1, a structural member assembly table 100 includes an elongate worktable 110, a drop-down platform 150, and a conveyor table 190. As depicted in the illustrated embodiment, the worktable 110, drop-down platform 150, and the conveyor table 190 are longitudinally aligned with the drop-down platform 150 disposed between the worktable 110 and the conveyor table 190. The depicted embodiment of FIG. 1 includes a pair of assembly stations positioned side by side and configured for the assembly of two structural members simultaneously. In other embodiments, the structural member assembly table 100 may include a single assembly station configured for the assembly of structural members sequentially.

The worktable 110 includes a frame 111 for supporting a horizontally oriented, planar work surface 112 horizontally oriented within a first plane. A first side rail 114 and a second side rail 115 are coupled to the work surface 112. The rails 114, 115 are oriented parallel to a longitudinal axis of the work surface 112 and parallel to each other. A space 117 between the rails 114, 115 is configured to receive the structural member with the rails 114, 115 retaining upper and lower sides of the structural member. In some embodiments, a width of the space 117 or the distance between the rails 114, 115 may be equivalent to a desired height (or other dimension) of the structural member. In other embodiments, one or both rails 114, 115 may be moveable to provide a transverse compressive force to the structural member during assembly to facilitate a consistent assembled height of the structural member. One or both rails 114, 115 may be moved manually or by an actuator.

The illustrated worktable 110 includes one or more conveyor rollers 116 transversely disposed within the space 117 to facilitate longitudinal displacement of the assembled structural member from the worktable 110. At least one of the conveyor rollers 116 may be powered to automatically displace the assembled structural member. In another embodiment, the conveyor rollers 116 may be passive to allow manual displacement of the assembled structural member by a worker. The conveyor rollers 116 may be located within slots 118 disposed through the work surface 112. In some embodiments, a width of the slots 118 may be less than a diameter of the conveyor rollers 116 to minimize areas where the structural member is not supported by the work surface 112 during assembly. The conveyor rollers 116 can be selectively vertically displaced within the slots 118. For example, during assembly of the structural member the conveyor rollers 116 may be positioned below the plane of the work surface 112 to provide a flat surface for the structural member to rest on during assembly. Following assembly of the structural member, the conveyor rollers 116 can be displaced upwardly within the slots 118 such that a portion of the conveyor rollers 116 is above the work surface 112 and in contact with the assembled structural member to elevate the assembled structural member off the work surface 112. In some embodiments, the conveyor rollers 116 can elevate the assembled structural member from about 0.3 centimeter to about 15 centimeters above the work surface 112.

A first end datum 113 is coupled to the work surface 112 and disposed adjacent or near a first end of the worktable 110 between the rails 114, 115. The first end datum 113 may include a rectangular shape and a first engagement or contact surface 119 configured to contact a first end of the structural member during assembly. The first end datum 113 can be fixedly coupled to the work surface 112. In another embodiment, the first end datum 113 may be selectively coupled to the work surface 112 such that it is moveable along a length of the work surface 112 to accommodate structural members of various lengths. The first end datum 113 may be formed of any suitable rigid material, such as steel, aluminum, wood, plastic, etc.

In an embodiment, the drop-down platform 150 can be pivotably coupled to a second end of the worktable 110. As illustrated in FIGS. 2A and 2B, the drop-down platform 150 includes a support surface 151 and a drop-down mechanism 170. The support surface 151 is planar and extends from the work surface 112 in the plane of the work surface 112 when the drop-down platform 150 is in an operational position (as shown in FIGS. 2A and 2B) and is angled downward relative to the plane of the work surface 112 when the drop-down platform 150 is in an eject position (as illustrated in FIG. 4). In another embodiment, the support surface 151 may be displaced perpendicularly relative to the plane of the work surface 112 by the drop-down mechanism 170. In this embodiment, the support surface 151 can remain parallel to (and below) the plane of the work surface when the drop-down platform 150 is in the eject position.

FIGS. 2A and 2B are perspective views of the drop-down platform 150, according to one embodiment, in an operational position at an end of the assembly table 110. The drop-down mechanism 170 is configured to transition the support surface 151 from the operational position to the eject position. As illustrated in FIGS. 2A and 2B, the drop-down mechanism 170 includes a drop-down actuator 171. The drop-down actuator 171 is coupled to and disposed between the frame 111 and the support surface 151. The drop-down actuator 171 may include any suitable type of linear actuator capable of transitioning the support surface 151 between the operational position and the eject position. For example, the drop-down actuator 171 may be one or more of a hydraulic actuator, a pneumatic actuator, an electric actuator, an electromechanical actuator, an electrohydraulic actuator, a linear motor, and a mechanical actuator. Other types of actuators are contemplated and within the scope of this disclosure. The drop-down actuator 171 may be manually activated via a switch. In other embodiments, the drop-down actuator 171 can be activated via a programed controller.

In certain other embodiments, the drop-down mechanism 170 includes a guide panel 172. The guide panel 172 is fixedly coupled to the frame 111 and includes a slot 173 disposed therethrough having an arcuate shape. The support surface 151 may include a pin or dowel 174 that is operably coupled to the slot 173 such that when the drop-down actuator 171 transitions the support surface 151 between the operational position and the eject position, the pin 174 of the support surface 151 follows the arcuate shape of the slot 173.

A second end datum 160 is coupled to and disposed on the support surface 151. The second end datum 160 is configured to apply a longitudinally directed force to a second end of the structural member during assembly.

FIGS. 3A and 3B are perspective views of a second end datum 160, according to one embodiment of the present disclosure. The second end datum 160 includes a frame 161, a cover 162, a compression actuator 163, and a compression bar 164. The frame 161 includes four side members that are couplable to the support surface 151. In some embodiments, only two of the four side members are coupled to the support surface 151 used a suitable fastener. The cover 162, as shown in FIG. 3A, is coupled to the frame 161 to provide a protective covering for the one or more compression actuators 163 disposed within a cavity defined by the frame 161. The compression actuators 163 can linearly displace the compression bar 164, as shown in FIG. 3B, to apply a compressive force to the structural member during assembly. The compression actuators 163 may include any suitable type of linear actuator capable of linearly displacing the compression bar 164. For example, the compression actuator 163 may be one or more of a hydraulic actuator, a pneumatic actuator, an electric actuator, an electromechanical actuator, an electrohydraulic actuator, a linear motor, and a mechanical actuator. Other types of actuators are contemplated within the scope of this disclosure. The compression actuators 163 may be manually activated via a switch. In other embodiments, the compression actuators 163 can be activated via a programed controller.

The compression bar 164 may include a rectangular shape and a second engagement or contact surface 166 configured to contact a second end of the structural member during assembly. The compression bar 164 is coupled to the compression actuators 163. As shown in FIG. 3B, the compression bar 164 is coupled to linear rods 165 of the compression actuators 163. In other embodiments, the compression bar 164 may be coupled to the compression actuators 163 using any suitable technique. The compression bar 164 may be formed of any suitable rigid material, such as steel, aluminum, wood, plastic, etc.

As illustrated in FIGS. 2A and 2B, the support surface 151 is in the operational position. In the operational position, the support surface 151 is substantially planar with the plane of the work surface 112 and the second end datum 160 is disposed above the plane of the work surface 112. When the support surface 151 is in the operational position, for the assembled structural member to be longitudinally displaced from the worktable 110 to the conveyor table 190, the assembled structural member would need to be elevated above the second end datum 160. For example, in certain embodiments, the conveyor rollers 116 may be configured to lift or elevate the assembled structural member above the work surface 112 and the second end datum 160 to allow the assembled structural member to be longitudinally moved. Elevating the assembled structural member above the second end data can require extra displacement of the rollers above the work surface 112, which can require larger rollers and larger slots in the work surface 112 to accommodate a higher positioning of the larger rollers. The larger rollers and more particularly the larger slots in the work surface 112 can present challenges and complications that can disadvantage automated assembly of a structural member on the assembly table. The drop-down platform 150 can reposition the second end datum 160 out of an ejection path of the structural member.

As illustrated in FIG. 4, the drop-down platform 150, and specifically the support surface 151, is in the eject position. In the eject position, the support surface 151 is pivoted at an end adjacent to the work surface 112 by the drop-down mechanism 170 such that the support surface 151 is nonplanar relative to the plane of the work surface 112. In the eject position, an angle of the support surface 151 relative to the plane of the work surface 112 may range from about 30 degrees to about 90 degrees and may be between 70 degrees and 90 degrees. When the support surface 151 is in the eject position, the second end datum 160, including the second engagement surface 166 of the compression bar 164, is disposed below the plane of the work surface 112 such that the assembled structural member can be longitudinally moved from the worktable 110, over the second end datum 160, and on to the conveyor table 190. When the assembled structural member is moved, it may be elevated above the work surface 112 a distance that is less than a height of the second end datum 160.

As illustrated in FIG. 1, the conveyor table 190 is disposed adjacent to the drop-down platform 150 such that the drop-down platform 150 is disposed between the worktable 110 and the conveyor table 190. The conveyor table 190 is configured to receive the assembled structural member when it is moved from the worktable 110. As depicted, the conveyor table 190 includes a frame 191 and a plurality of passive or powered conveyor rollers 192 configured to allow the assembled structural member to move along a length of the conveyor table 190.

In other embodiments, a mechanism or structure other than a conveyor table 190 may receive the assembled structural member. For example, a conveyor, a transport station (e.g., for retrieval or other transport, such as by a forklift, flatbed trailer or rail car, etc.), a packing station (e.g., for packing the structural member, such as on a pallet), a buffer station (e.g., for providing the assembled structural member as an input to a further assembly) or the like may be positioned in lieu of the conveyor table 190 to receive the assembled structural member.

FIGS. 5 and 6 illustrate a method of assembling a structural member utilizing the structural member assembly table 100 as previously described. As illustrated in FIG. 5, a structural member 130 (e.g., a floor truss) can be assembled at a position located within the space 117 on the work surface 112 of the worktable 110 between the side rails 114, 115 and the first end datum 113 and the second end datum 160. The structural member 130 depicted includes chords 131 to form a top and a bottom of the structural member 130 and verticals 132 and diagonals 133 disposed between the chords 131 to form a webbing of the structural member 130. The chords 131, verticals, 132, and diagonals 133 may be positioned on the assembly table by a robot (e.g., a six-axis robotic arm), in some embodiments. Nail plates 134 are located over the joints of the chords 131, verticals 132, and diagonals 133 to couple the chords 131 to the verticals 132 and the diagonals 133. The nail plates 134 can include a plurality of sharp projections or "nails" configured to penetrate into the chords 131, verticals 132, and diagonals 133 when hammered by a worker or pressed by a gantry 180, as will be described below. The nail plates 134 may also be positioned by a robot.

The drop-down platform 150, in FIG. 5, is in the operational position wherein the drop-down actuator 171 is holding the support surface 151 planar with the work surface 112. The second end datum 160 is applying a longitudinal compressive force to the structural member 130. The gantry 180 is located adjacent an end of the conveyor table 190.

FIG. 6 is a perspective view of the structural member assembly table 100 and illustrates the structural member 130, following assembly, being moved from the worktable 110 to the conveyor table 190. The gantry 180 has already been moved along gantry rails 181 over the structural member 130 to press the nail plates 134 into the chords 131, verticals 132, and diagonals 133. (The second end datum 160 provided a longitudinal compressive force on the structural member 130 against the first end datum 113 to secure the structural member 130 in place while the gantry 180 applied a vertical force to press the nail plates 134.) In other embodiments, the nail plates 134 may be hammered by a worker. The compression bar 164, in FIG. 6, is retracted to release the compression force from the structural member 130. The drop-down actuator 171 transitions the support surface 151 from the operational position to the eject position. In the illustrated embodiment, the support surface 151 follows the slot 173 of the guide panel 172. In other embodiments, the support surface is displaced downward perpendicular to the plane of the work surface 112. The conveyor rollers 116 engage with a bottom surface of the structural member 130 and elevate the structural member 130 a distance above the work surface 112 (that can be less than the height of the second end datum 160 because the drop-down platform 150 is in the eject position) to longitudinally move the structural member 130 from the worktable 110, over the drop-down platform 150, and onto the conveyor table 190.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified. For example, a method of assembling a truss may include one or more of the following steps: placing truss components on a worktable between a first end datum, a second end datum, a first side rail, and a second side rail; actuating the second end datum to apply a longitudinal compression force to the truss components; applying nailers to joints of the truss components; de-actuating the second end datum to release the longitudinal compression force from the truss components; actuating a drop-down mechanism to transition a drop-down platform from an operation position to an eject position; and ejecting the truss components from the worktable when the drop-down platform is in the eject position. Other steps, such as compressing nailers into the truss, are also contemplated.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

In the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment.

The phrase "coupled to" refers to any form of interaction between two or more entities, including mechanical, electrical, magnetic, electromagnetic, fluid, and thermal interaction. Two components may be coupled to each other even though they are not in direct contact with each other. For example, two components may be coupled to each other through an intermediate component.

References to approximations are made throughout this specification, such as by use of the term "substantially." For each such reference, it is to be understood that, in some embodiments, the value, feature, or characteristic may be specified without approximation. For example, where qualifiers such as "about" and "substantially" are used, these terms include within their scope the qualified words in the absence of their qualifiers. For example, where the term "substantially perpendicular" is recited with respect to a feature, it is understood that in further embodiments, the feature can have a precisely perpendicular configuration.

The terms "a" and "an" can be described as one, but not limited to one. For example, although the disclosure may recite a second end datum having "an actuator," the disclosure also contemplates that the second end datum can have two or more actuators.

Unless otherwise stated, all ranges include both endpoints and all numbers between the endpoints.

Recitation in the claims of the term "first" with respect to a feature or element does not necessarily imply the existence of a second or additional such feature or element.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description.

Without further elaboration, it is believed that one skilled in the art can use the preceding description to utilize the invention to its fullest extent. The claims and embodiments disclosed herein are to be construed as merely illustrative and exemplary, and not a limitation of the scope of the present disclosure in any way. It will be apparent to those having ordinary skill in the art, with the aid of the present disclosure, that changes may be made to the details of the above-described embodiments without departing from the underlying principles of the disclosure herein. In other words, various modifications and improvements of the embodiments specifically disclosed in the description above are within the scope of the appended claims. Moreover, the order of the steps or actions of the methods disclosed herein may be changed by those skilled in the art without departing from the scope of the present disclosure. In other words, unless a specific order of steps or actions is required for proper operation of the embodiment, the order or use of specific steps or actions may be modified. The scope of the invention is therefore defined by the following claims and their equivalents.

The invention claimed is:

1. A truss assembly table, comprising:
an elongate worktable comprising:
   a horizontally oriented work surface upon which components are positioned to assemble a truss; and
   a first end datum disposed adjacent a first end of the elongate worktable, the first end datum having a first engagement surface to engage a first end of the truss; and
a drop-down platform pivotably coupled to a second end of the elongate worktable comprising: a platform comprising a support surface;
   a second end datum coupled to the support surface of the platform, the second end datum having a second engagement surface to engage a second end of the truss, wherein the second end datum comprises a compression actuator and a compression bar coupled to the compression actuator and comprising the second engagement surface; and
   a drop-down mechanism configured to transition the support surface from an operational position to an eject position.

2. The truss assembly table of claim 1,
wherein the support surface is oriented horizontally and in alignment with the horizontally oriented work surface when in the operational position, and
wherein the support surface is oriented at an angle relative to the horizontally oriented work surface when in the eject position.

3. The truss assembly table of claim 1, wherein the second end datum is disposed below a plane of the horizontally oriented work surface when the support surface is in the eject position.

4. The truss assembly table of claim 1,
wherein the second end datum is configured to apply a longitudinal compressive force to the truss when the support surface is in the operational position, and
wherein the second end datum is configured to release the longitudinal compressive force from the truss when the support surface is in the eject position.

5. The truss assembly table of claim 1, wherein the drop-down mechanism comprises:

a drop-down actuator coupled to the support surface.

6. The truss assembly table of claim 5, wherein the drop-down mechanism comprises a guide panel, wherein the guide panel comprises an arcuate slot, and wherein the support surface is coupled to the arcuate slot to guide the support surface from the operational position to the eject position.

7. The truss assembly table of claim 1, further comprising conveyor rollers, wherein the conveyor rollers are disposed below the horizontally oriented work surface when the support surface is in the operational position, wherein at least a portion of the conveyor rollers are disposed above the horizontally oriented work surface when the support surface is in the eject position, and wherein the conveyor rollers are configured to elevate the truss above the horizontally oriented work surface a distance that is less than a height of the second end datum.

8. A structural member assembly system, comprising:

an assembly table providing a work surface within a horizontally oriented first plane, the work surface to couple to a first end datum to be disposed on the work surface adjacent a first end of the assembly table to extend above the horizontally oriented first plane and to engage a first end of a structural member;

a drop-down platform disposed at a second end of the assembly table, the drop-down platform providing a support surface within a second plane, the support surface to couple to a second end datum to be disposed on the support surface to engage a second end of the structural member, the second end datum comprising a compression actuator and a compression bar coupled to the compression actuator and comprising a second engagement surface; and a drop-down mechanism to transition the support surface from an operational position to an eject position.

9. The structural member assembly system of claim 8, wherein the second plane is oriented parallel to the horizontally oriented first plane when the support surface is in the operational position, and wherein the second plane is oriented at an angle relative to the horizontally oriented first plane when the support surface is in the eject position.

10. The structural member assembly system of claim 8, wherein the second end datum is disposed below the horizontally oriented first plane when the support surface is in the eject position.

11. The structural member assembly system of claim 8, wherein the second end datum is configured to apply a longitudinal compressive force to the structural member when the support surface is in the operational position, and wherein the second end datum is configured to release the longitudinal compressive force from the structural member when the support surface is in the eject position.

12. The structural member assembly system of claim 8, wherein the drop-down mechanism comprises:

a drop-down actuator coupled to the support surface.

13. The structural member assembly system of claim 8, further comprising a gantry configured to roll along a length of the assembly table when the support surface is in the operational position and the structural member is compressed between the first end datum and the second end datum.

14. The structural member assembly system of claim 8, further comprising a conveyor table to receive the structural member when assembled from the assembly table.

* * * * *